(12) United States Patent
Jackson et al.

(10) Patent No.: US 6,546,494 B1
(45) Date of Patent: Apr. 8, 2003

(54) PROVIDING POWER TO A DEVICE OVER A NETWORK TRANSMISSION MEDIUM

(75) Inventors: Stephen S. Jackson, Chapel Hill, NC (US); Jennifer G. Rasimas, Durham, NC (US)

(73) Assignee: Nortel Networks Corporation, Montreal (CA)

( * ) Notice: Subject to any disclaimer, the term of this patent is extended or adjusted under 35 U.S.C. 154(b) by 0 days.

(21) Appl. No.: 09/413,141

(22) Filed: Oct. 6, 1999

(51) Int. Cl.[7] .................................................. G06F 1/26
(52) U.S. Cl. ...................................................... 713/300
(58) Field of Search ................................ 713/300, 310, 713/340

(56) References Cited

U.S. PATENT DOCUMENTS

| | | | |
|---|---|---|---|
| 4,535,401 A | 8/1985 | Penn | |
| 5,635,896 A * | 6/1997 | Tinsley et al. | 340/310.05 |
| 5,796,965 A | 8/1998 | Choi et al. | |
| 6,125,448 A * | 9/2000 | Schwan et al. | 713/300 |
| 6,141,763 A * | 10/2000 | Smith et al. | 713/300 |

FOREIGN PATENT DOCUMENTS

EP          0 660 287 A1     6/1995

* cited by examiner

*Primary Examiner*—Thomas M. Heckler
(74) *Attorney, Agent, or Firm*—Fish & Richardson P.C.

(57) ABSTRACT

An apparatus provides power to a device over a network transmission medium. The apparatus includes a controller which determines if the device can accept power over the network transmission medium, and which outputs a signal if the device can accept power over the network transmission medium. A circuit provides power to the device over the network transmission medium in response to the signal.

37 Claims, 5 Drawing Sheets

PROVIDING POWER TO A DEVICE OVER A NETWORK TRANSMISSION MEDIUM

BACKGROUND OF THE INVENTION

This invention relates to providing power to a device over a network transmission medium.

Network devices, such as personal computers ("PCs") and IP ("Internet Protocol") telephones, traditionally received power from wall outlets. Such devices have additional wiring to connect them to the wall outlets. In some configurations, this can be inefficient, particularly for devices that are connected to networks via transmission media, such as Ethernet, that are capable of transmitting power with little or no adverse effect on network data. Systems were therefore developed for providing power to a device over Ethernet wiring.

SUMMARY OF THE INVENTION

Not all devices, however, can withstand application of power via Ethernet wiring. In devices that are not configured to accept power via Ethernet, receipt of power via Ethernet can cause damage to circuitry in the devices.

Accordingly, in one aspect, the invention features a method which determines if a device can accept power over a network transmission medium, and which provides power to the device over the network transmission medium if it is determined that the device can accept power over the network transmission medium. By determining whether the device can accept power before applying the power, the invention reduces damage caused by improper application of power.

This aspect of the invention may include one or more of the following features. Determining if the device can accept power over the network transmission medium includes sensing if there is an overcurrent condition in the device and/or sensing if the device is receiving power from another source. The method determines if the device can accept power by supplying an initial power pulse to the device over the network transmission medium, determining whether the device can handle additional power based on the initial power pulse, and supplying a test power pulse to the device over the network transmission medium if the device can handle the additional power. The initial power pulse may be shorter than the test power pulse.

The method determines if the device can handle the additional power by sensing an amount of current that is absorbed by the device in response to the initial power pulse, and determining whether the device can handle the additional power based on the amount of current that is absorbed by the device. The amount of current that is absorbed by the device is sensed using a resistor that is coupled in series with the network transmission medium.

The method may include receiving an indication, in response to the test power pulse, that the device can accept power over the network transmission medium. The indication may comprise a link status bit that is transmitted from the device. The method may store data indicating whether power is being supplied to the device. The power provided to the device may be controlled by a remote network device. The network transmission medium may comprise an Ethernet line.

Other features and advantages will become apparent from the following description and the claims.

DESCRIPTION OF THE PREFERRED EMBODIMENTS

Figure 1:
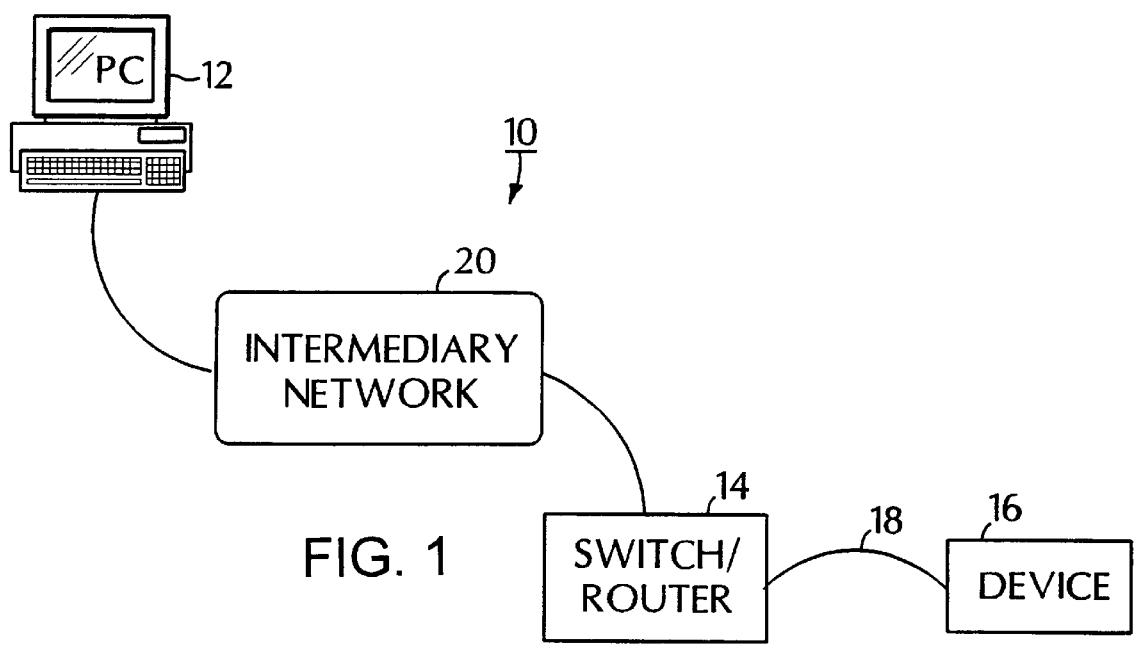
FIG. 1 is a view of a network system.

Referring to FIG. 1, a network system 10 is shown. Network system 10 includes devices 12, 14 and 16, network transmission medium 18, and intermediary network 20. Device 12 is a PC, or other processing device, that is capable of receiving, processing and transmitting data packets via intermediary network 20. Intermediary network 20 may be any type of network, such as the Internet, a local area network ("LAN"), a wide area network ("WAN"), or an asynchronous transfer mode ("ATM") network. Device 14 links device 16 to intermediary network 20. Devices 14 and 16 are connected by network transmission medium 18, such as Ethernet wiring, and are generally part of the same LAN (though this is not a requirement). Device 16 may be any type of network device, such as a PC, a computer peripheral, an IP telephone, and a small appliance. Device 14 is typically a switch or a router; however, other network devices may also be used.

In addition to routing network packets and other functions, device 14 supplies power to device 16 over network transmission medium 18. Device 14 receives AC ("Alternating Current") power from a power source which is either internal to, or external to, device 14 (for example, the power source may be in a "wiring closet" for device 14). A rectifier (not shown) converts the AC power to, e.g., +48 V ("Volts") of DC ("Direct Current") power, and provides the DC power to circuitry in device 14. The circuitry supplies this power to device 16 over network transmission medium 18.

Figure 2:
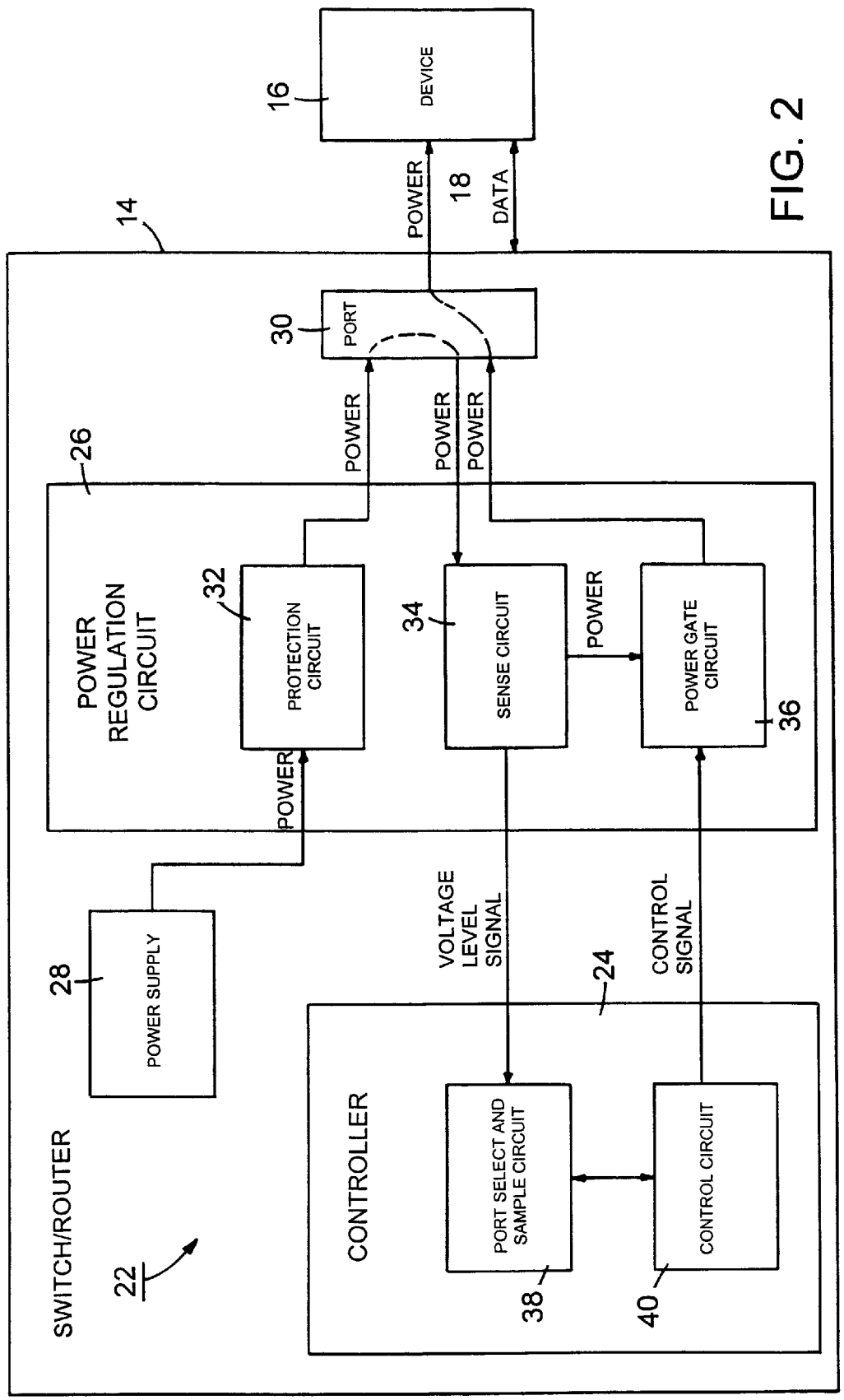
FIG. 2 is a block diagram of circuitry for providing power over a network transmission medium in the system.

Referring to FIG. 2, a block diagram of the circuitry 22 in device 14 is shown. Circuitry 22 includes a controller 24 and a power regulation circuit 26. Connected to power regulation circuit 26 are a power supply 28, which provides the +48 V noted above, and a port 30, such as a connector, which connects to network transmission medium 18. In this embodiment, power supply 28 is a Jini-enabled, network-attached modular power source. Jini is a Java-based distributed computing environment from Sun Microsystems®, in which devices can be plugged into a network and automatically offer their services, and make use of services, on the network. Power regulation circuit 26 is used to regulate the supply of power from power supply 28 to device 16.

Power regulation circuit 26 includes protection circuit 32, sense circuit 34, and power gate circuit 36. Protection circuit 32 is a fuse or suppressor circuit which protects wiring and circuitry in networked devices in case power is inadvertently applied. Power is routed from power supply 28 to power gate circuit 36 through the same port 30 that connects to network transmission medium 18. Power gate circuit 36 comprises a switch which closes in response to signals from controller 24 to provide power from power supply 28 to port 30. Sense circuit 34 monitors the amount of current that device 16 absorbs in response to a power pulse, and provides this information to controller 24. Controller 24 uses this information to determine whether device 16 can handle continuous power over network transmission medium 18.

Controller 24 includes a port select and sample circuit 38 and a control circuit 40. These circuits may be implemented using a programmed gate array in combination with a CPU ("Control Processing Unit"), such as a microprocessor. Alternatively, controller 24 may be implemented using an ASIC ("Application-Specific Integrated Circuit"). In any case, control circuit 24 receives signals provided by sense circuit 34 and determines, based on these signals, whether and when to open/close the switch of power gate circuit 36. Port select and sample circuit 38 is used to select different ports, over which power is to be supplied. For example, a single circuit board may include several power regulation circuits 26 (protection circuit 32, sense circuit 34, and power gate circuit 36) in order to provide power to network transmission media over several different ports. Port select and sample circuit 38 receives information from each sense circuit 34 on such a board, and control circuit 40 uses that information to determine whether power can be supplied over each port.

Figure 3:
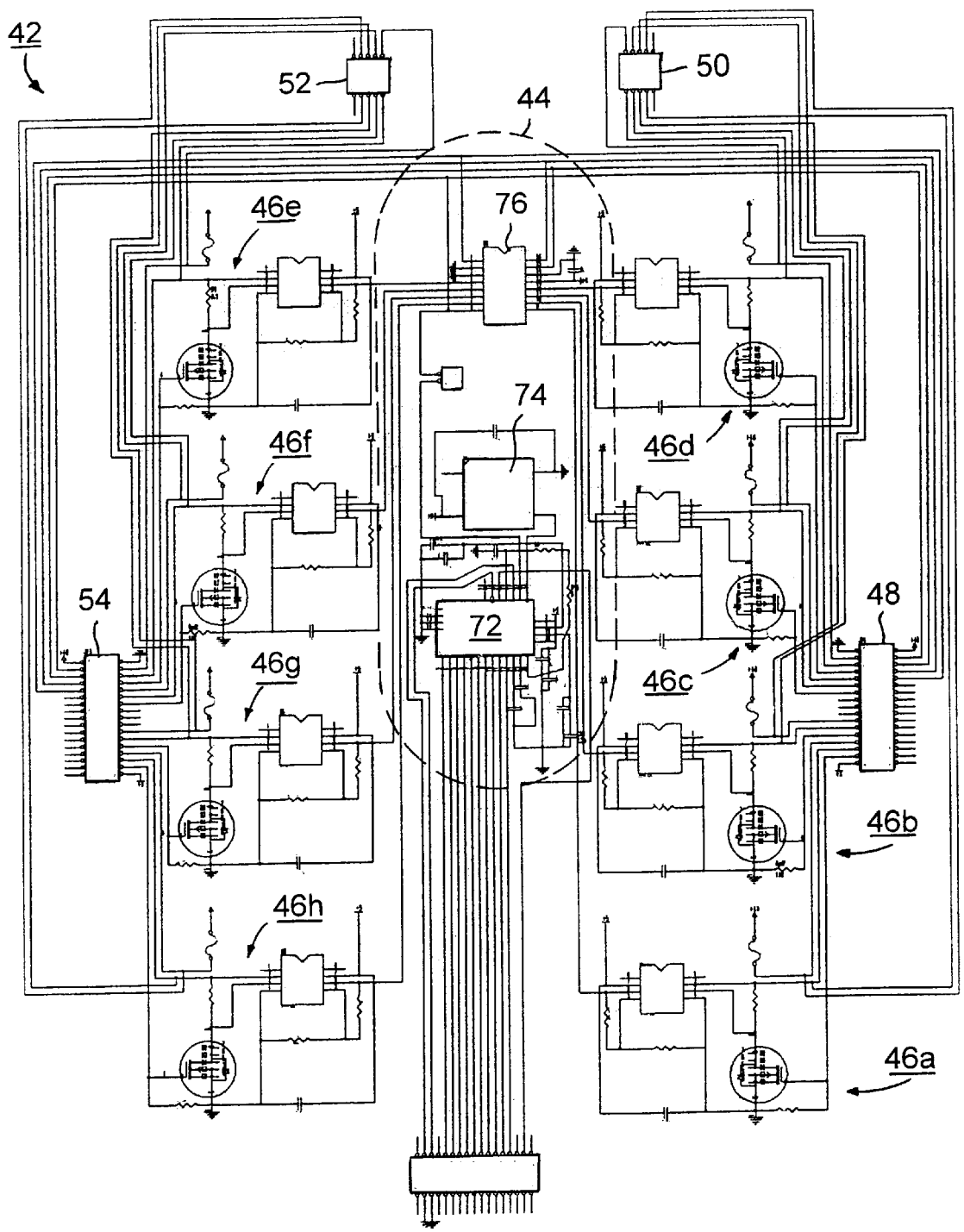
FIG. 3 is a circuit diagram showing a specific embodiment of the circuitry of FIG. 2.

FIG. 3 shows one implementation of circuitry 22. Specifically, FIG. 3 shows a circuit board 42 having a controller 44 and eight power regulation circuits 46a to 46h for providing power to network transmission media over eight ports (via connectors 48, 50, 52 and 54).

Figure 4:
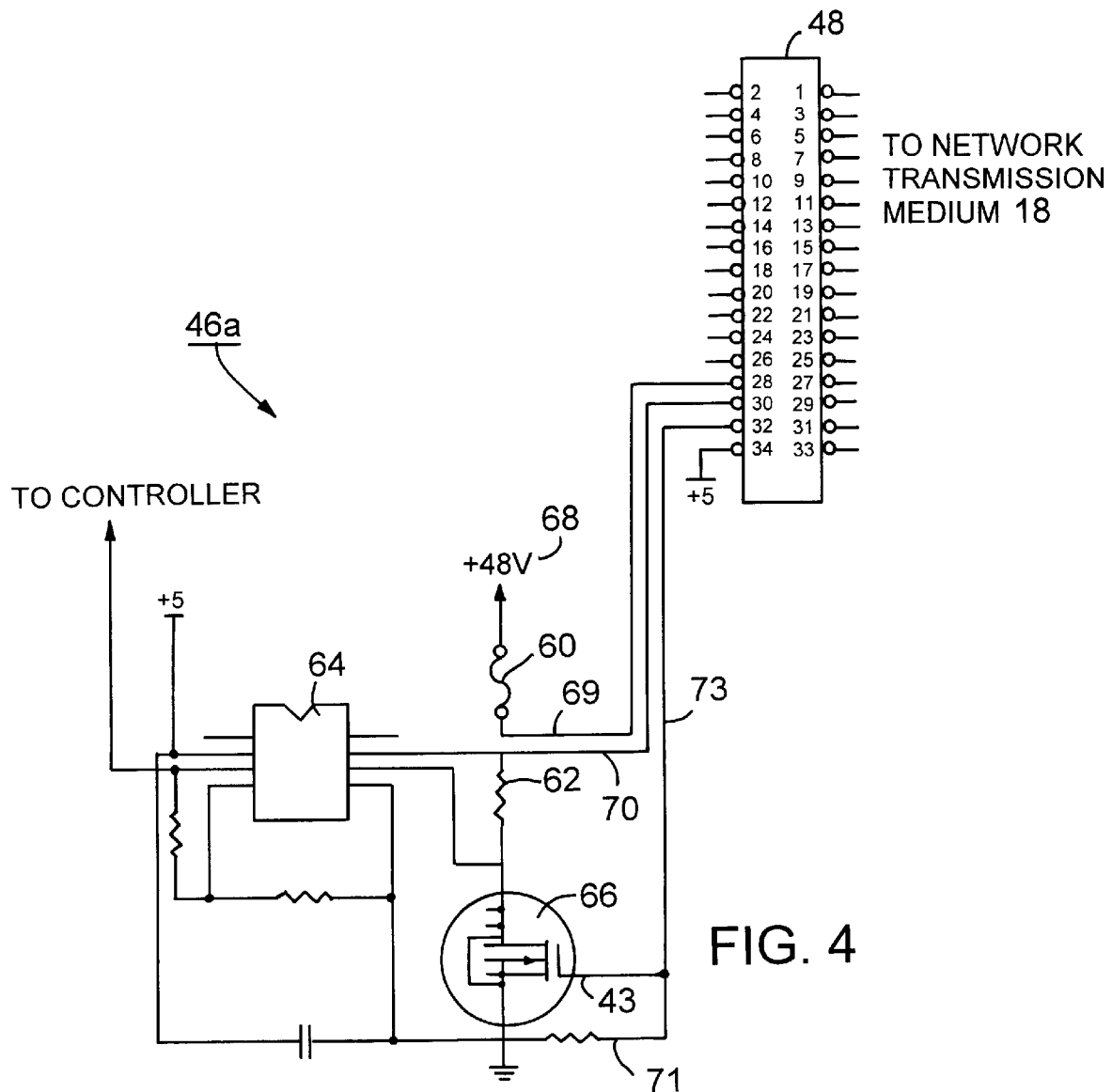
FIG. 4 is a close-up view of a power regulation circuit from the circuit diagram of FIG. 3.

Referring to FIG. 4, a close-up view of any of the power regulation circuits of FIG. 3 (e.g., 46a) is shown. Power regulation circuit 46a is identical to the other power regulation circuits on board 42. Fuse 60 comprises the protection circuit 32 of FIG. 2, sense resistor 62 and operational amplifier 64 comprise the sense circuit 34, and transistor 66 comprises the power gate circuit 36. Transistor 66 is a source-ballasted N-channel VFET; and fuse 60 is an auto-resetting chemical fuse constituting dead-man protection. Sense resistor 62 is on the order of 0.1 ohms ("Ω") and it is coupled in series with network transmission medium 18 (and thus device 16) relative to transistor 66. Power 68 is routed from power supply 68 to transistor 66 through connector 48 (via lines 69 and 70), such that, when transistor 66 is gated (i.e., the switch defined by transistor 66 is closed), power is supplied from line 70, through sense resistor 62, transistor 66, and line 71 to network transmission medium 18. As shown in FIG. 3, controller 44 includes a programmed gate array 72, a clock oscillator 74 to clock signals to/from gate array 72, and a multiplexer 76 to provide signals to/from the power regulation circuits of FIG. 3.

Figure 5:
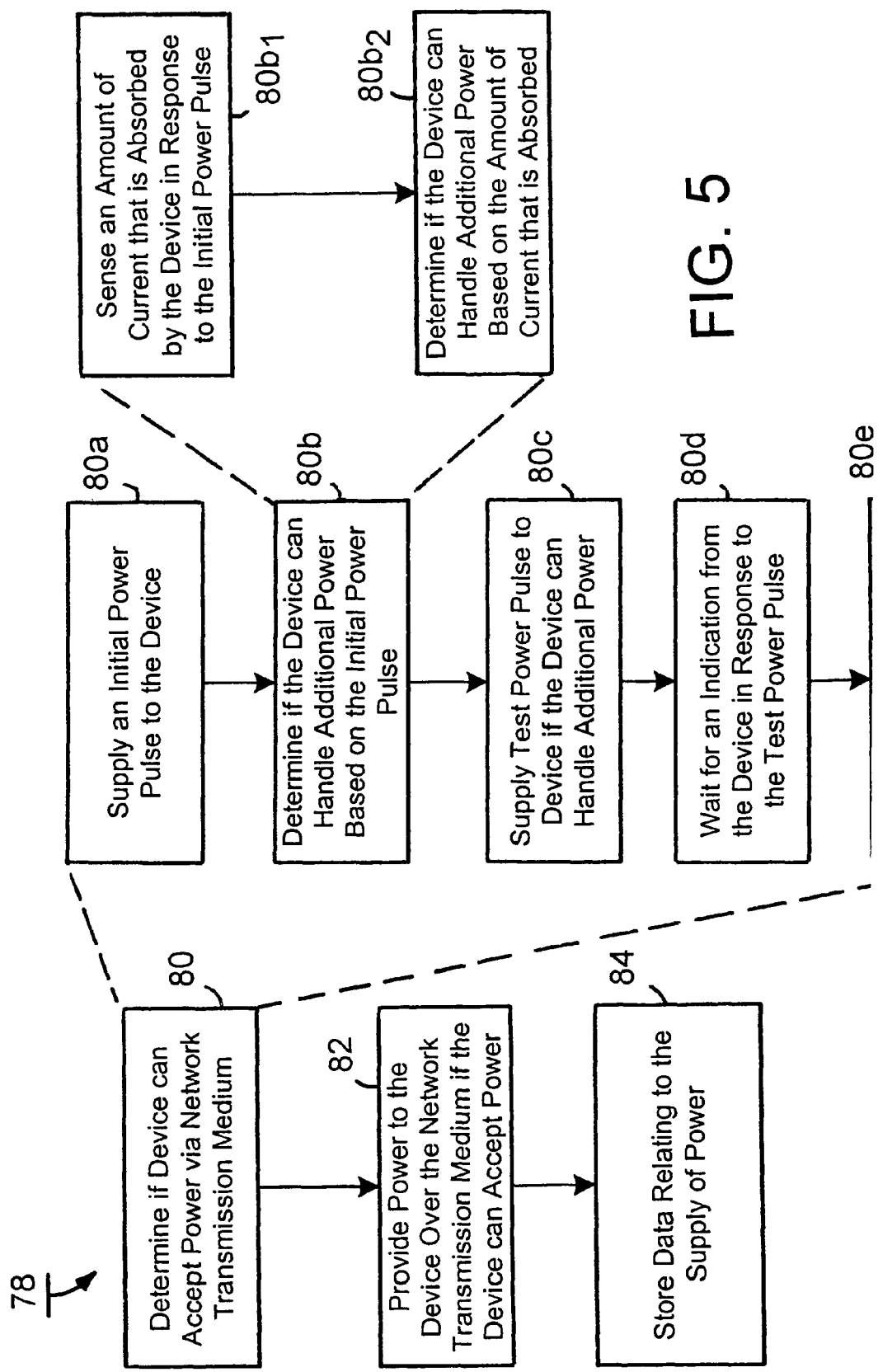
FIG. 5 is a flowchart showing a process for providing power over the network transmission medium.

Referring to FIG. 5, a process 78 is shown for controlling the circuitry shown in FIGS. 2, 3 and 4. Process 78 is implemented, in part, by computer program(s) executing on controller 24 in conjunction with the circuitry in one (or more) power regulation circuits.

Process 78 determines 80 if a networked device 16 is configured to accept power via network transmission medium 18 (and thus can withstand the application of such power). Determining 80 begins by supplying 80a an initial power pulse to device 16 over network transmission medium 18. Power is supplied over wires which do not carry data, such as those connected to pins seven and eight of a standard Ethernet connector. To supply this initial power pulse, controller 24 issues a signal to power gate circuit 36, which causes the switch of power gate circuit 36 to close for a period of time corresponding to the initial power pulse. For example, in circuit 46a (FIG. 4), a signal 43 from controller 44 (passed through operational amplifier 64), causes the switch defined by transistor 66 to close and provide power from line 70 to network transmission medium 18 (via sense resistor 62, line 71, and connector 48).

Referring back to FIG. 2, while power gate circuit 36 is closed, power from power supply 28 is provided to network transmission medium 18 (and thus to device 16) via port 30. The duration of the initial power pulse should be long enough to ascertain whether device 16 can handle additional power, yet short enough so as not to cause damage to circuitry in device 16. An initial power pulse on the order of 100 microseconds ("$\mu S$") satisfies both criteria for most devices. After the desired duration of the initial power pulse, controller 24 issues a signal which opens the switch of power gate circuit 36 (or, in the embodiment of FIG. 4, transistor 66).

When the initial power pulse is provided over network transmission medium 18, process 78 determines 80b if device 16 can handle additional power based on the initial power pulse. To do this, sense circuit 34 measures the amount of current that is absorbed by device 16 in response to the initial power pulse. For example, in circuit 46a (FIG. 4), operational amplifier 64 measures an amount of differential voltage across sense resistor 62 (which, as defined in Ohm's law, corresponds to an amount of current that device 16 is drawing), and outputs a "voltage level" signal to the controller that is indicative of this differential voltage. The controller senses $80b_1$ the amount of current that is absorbed by device 16 based on this voltage level signal.

Controller 24 determines $80b_2$ if device 16 can handle additional power based on the amount of current that device 16 absorbs. For example, if device 16 draws an inordinate amount of current (more than a preset amount), then controller 24 may determine that device 16 is unable to handle additional power. Controller 24 will not allow additional power to be supplied to device 16 in this case.

Other instances during which controller 24 will not allow additional power to be supplied include cases where there is a short circuit in device 16 and where device 16 is already receiving power from another source. Controller 24 determines that there is a short circuit in device 16 if device 16 draws an extremely large amount of current (an overcurrent condition) from power supply 28 (resulting in a relatively high voltage across resistor 62 in the embodiment of FIG. 4). Controller 24 determines if device 16 is receiving power from another source by measuring the polarity of the voltage across sense circuit 34 produced when the initial power pulse is supplied (in FIG. 4, operational amplifier 64 measures the polarity of the voltage across sense resistor 62). A negative polarity, relative to the voltage produced when current is provided from power supply 28, indicates that device 16 is receiving power from another source.

If controller 24 determines $80b_2$ that device 16 can handle additional power, controller 24 issues a signal which causes a test power pulse to be supplied 80c to device 16 over network transmission medium 18. The test power pulse is longer in duration than the initial power pulse. For example, it may be on the order of seconds. The test power pulse is supplied in the same manner as the initial power pulse. The only difference is the duration during which the switch defined by power gate circuit 36 (transistor 66) is closed to provide power.

After applying the test power pulse, controller 24 waits 80d for an indication from device 16 that device 16 can receive continuous power over network transmission medium 18. In this embodiment, the indication is a link status bit ("LSB") that is received from device 16 over network transmission medium 18; however, any other indication may be used. An LSB is used because many network devices are pre-configured to provide an LSB in response to a power pulse of a predetermined duration. Once the indication has been received 80e, process 78 provides 82 continuous power to device 16 over network transmission medium 18. This is done by closing the switch of power gate circuit 36 (transistor 66), providing power to device 16 from power supply 28.

Process 78 may store 84 data in a memory (not shown) that is internal to, or external to, switch 14. This data indicates the status of power to device 16; for example, that device 16 is receiving power over network transmission medium 18, is not receiving power, is receiving power from another source, or is suspected of having a short circuit. This data may be used to control transmission of power. For example, a computer may be interfaced to the controller in switch 14. The computer may be internal to switch 14 or it may be an external device. For example, the computer may be a remote network device, such as PC 12.

The computer executes software for controlling the supply of power via circuitry 22 (or 42). For example, the computer may instruct controller 42 to provide power to network transmission medium 18 over a particular port regardless of what type of device is connected to that port. Similarly, the computer can examine data stored in the memory (indicating, for example, that power is being supplied to a device via a port 30). Based on this data, the computer can turn off power to a device, turn power to the device on and off at different times (for example, power-off the device at night), or otherwise control power to the device. Basically, the computer can override decisions of controller 24/42.

Process 78 may be executed for each of the eight power regulation circuits 46a to 46h shown in FIG. 3. In the embodiment of FIG. 3, gate array 72 and multiplexer 76 are used to select one of the power regulation circuits for which processing is performed. The power regulation circuits may be selected in sequence, or otherwise.

Other embodiments not described herein are also within the scope of the following claims. For example, the invention is not limited to the circuit configurations shown in FIGS. 2, 3 and 4. Other circuitry can be used. Likewise, different circuit components can be used in place of those shown in the FIGs. The invention can be used to supply different amounts of power to different network transmission media (and thus to different devices via different ports). For example, rather than supplying +48 V DC from each of the eight power regulation circuits shown in FIG. 3, different amounts of power may be supplied from each circuit. The power may be supplied from different power supplies or "step-down" circuitry may be employed to reduce the amount of power. Power may supplied over network transmission media other than Ethernet.

It is to be understood that while the invention has been described in conjunction with the detailed description thereof, the foregoing description is intended to illustrate and not to limit the scope of the invention. Other aspects, advantages, and modifications are within the scope of the following claims.

What is claimed is:

1. A method of providing power to a device over a network transmission medium, comprising:

determining if the device can accept power over the network transmission medium; and providing power to the device over the network transmission medium if it is determined that the device can accept power over the network transmission medium.

2. The method of claim 1, wherein determining comprises:

supplying an initial power pulse to the device over the network transmission medium;

determining whether the device can handle additional power based on the initial power pulse; and supplying a test power pulse to the device over the network transmission medium if the device can handle the additional power.

3. The method of claim 2, further comprising receiving an indication, in response to the test power pulse, that the device can accept power over the network transmission medium.

4. The method of claim 3, wherein the indication comprises a link status bit that is transmitted from the device.

5. The method of claim 2, wherein determining whether the device can handle the additional power comprises:

sensing an amount of current that is absorbed by the device in response to the initial power pulse; and determining whether the device can handle the additional power based on the amount of current that is absorbed by the device.

6. The method of claim 5, wherein the amount of current that is absorbed by the device is sensed using a resistor that is coupled in series with the network transmission medium.

7. The method of claim 2, wherein the initial power pulse is shorter in duration than the test power pulse.

8. The method of claim 1, wherein determining comprises sensing if there is an overcurrent condition in the device.

9. The method of claim 1, wherein determining comprises sensing if the device is receiving power from another source.

10. The method of claim 1, further comprising storing data indicating whether power is being supplied to the device.

11. The method of claim 1, further comprising controlling the power provided to the device via a remote network device.

12. The method of claim 1, wherein the network transmission medium comprises an Ethernet line.

13. An apparatus for providing power to a device over a network transmission medium, comprising:

a controller which determines if the device can accept power over the network transmission medium, and which outputs a signal if the device can accept power over the network transmission medium; and a circuit which provides power to the device over the network transmission medium in response to the signal.

14. The apparatus of claim 13, wherein the controller:

causes an initial power pulse to be supplied to the device over the network transmission medium;

determines whether the device can handle additional power based on the initial power pulse; and causes a test power pulse to be supplied to the device over the network transmission medium if the device can handle the additional power.

15. The apparatus of claim 14, wherein the controller receives an indication, in response to the test power pulse, that the device can accept power over the network transmission medium.

16. The apparatus of claim 15, wherein the indication comprises a link status bit that is transmitted from the device.

17. The apparatus of claim 14, wherein the controller:

senses an amount of current that is absorbed by the device in response to the initial power pulse; and determines whether the device can handle the additional power based on the amount of current that is absorbed by the device.

18. The apparatus of claim 17, further comprising:

a resistor disposed in series with the network transmission medium and the device; and an operational amplifier which provides a signal related to current absorbed by the device by sensing a differential voltage across the resistor.

19. The apparatus of claim 14, wherein the initial power pulse is shorter in duration than the test power pulse.

20. The apparatus of claim 13, wherein the controller senses if there is an overcurrent condition in the device.

21. The apparatus of claim 13, wherein the controller senses if the device is receiving power from another source.

22. The apparatus of claim 21, further comprising:

a resistor disposed in series with the network transmission medium and the device; and an operational amplifier which measures a polarity of a differential voltage across the resistor;

wherein the controller senses if the device is receiving power from another source based on the polarity of the differential voltage across the resistor.

23. The apparatus of claim 13, further comprising a memory, wherein the controller stores data in the memory indicating whether power is being supplied to the device.

24. The apparatus of claim 13, wherein the network transmission medium comprises an Ethernet line.

25. A computer program stored on a computer-readable medium for controlling a supply of power to a device over a network transmission medium, the computer program comprising instructions that cause a computer to:

determine if the device can accept power over the network transmission medium; and output a signal that causes power to be supplied to the device over the network transmission medium if it is determined that the device can accept power over the network transmission medium.

26. The computer program of claim 25, wherein instructions to determine if the device can accept power comprise instructions that cause the computer to:

cause an initial power pulse to be supplied to the device over the network transmission medium;

determine whether the device can handle additional power based on the initial power pulse; and cause a test power pulse to be supplied to the device over the network transmission medium if the device can handle the additional power.

27. The computer program of claim 26, further comprising instructions that cause the computer to receive an indication, in response to the test power pulse, that the device can accept power over the network transmission medium.

28. The method of claim 27, wherein the indication comprises a link status bit that is transmitted from the device.

29. The computer program of claim 25, further comprising instructions that cause the computer to:

store data indicating whether power is being supplied to the device.

30. The computer program of claim 25, wherein the computer determines if the device can accept power based on a signal from an operational amplifier which relates to current absorbed by the device.

31. A system for providing power to a device over a network transmission medium, comprising:

a power supply;

circuitry for providing power from the power supply to the device over the network transmission medium; and a controller which determines if the device can accept power over the network transmission medium and, if so, outputs a signal to the circuitry that causes the circuitry to provide the power.

32. The system of claim 31, further comprising a second network device which instructs the controller regarding output of the signal.

33. The system of claim 31, wherein the network transmission medium comprises an Ethernet line.

34. The system of claim 31, wherein the controller comprises a gate array.

35. The system of claim 31, wherein the controller comprises a microprocessor.

36. The system of claim 31, wherein the circuitry comprises:

a switch disposed between the network transmission medium and the power supply which is responsive to the signal output by the controller, the switch operating in an open position during which power is not supplied to the network transmission medium, and a closed position during which power is supplied to the network transmission medium;

a resistor disposed in series with the network transmission medium and the device; and an operational amplifier which measures an amount of current that is absorbed by the device based on a differential voltage across the resistor, and which outputs a voltage level signal to the controller;

wherein the controller determines if the device can accept power over the network transmission medium based on the voltage level signal provided by the operational amplifier.

37. The system of claim 36, wherein the switch comprises a transistor.

* * * * *